United States Patent
Kyung et al.

(10) Patent No.: US 9,148,310 B2
(45) Date of Patent: Sep. 29, 2015

(54) APPARATUS AND METHOD FOR ADAPTIVELY ESTIMATING CHANNEL IN ORTHOGONAL FREQUENCY DIVISION MULTIPLEXING (OFDM) SYSTEM

(71) Applicant: SAMSUNG ELECTRONICS CO., LTD., Suwon-si (KR)

(72) Inventors: Gyu Bum Kyung, Seoul (KR); Ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/197,005

(22) Filed: Mar. 4, 2014

(65) Prior Publication Data

US 2014/0254651 A1    Sep. 11, 2014

(30) Foreign Application Priority Data

Mar. 11, 2013    (KR) ........................ 10-2013-0025419

(51) Int. Cl.
*H04L 25/02* (2006.01)
*H04L 1/20* (2006.01)
*H04L 25/03* (2006.01)
(Continued)

(52) U.S. Cl.
CPC ............. *H04L 25/0212* (2013.01); *H04L 1/20* (2013.01); *H04L 25/0202* (2013.01); *H04L 25/022* (2013.01); *H04L 25/0222* (2013.01); *H04L 25/03038* (2013.01); *H04L 25/067* (2013.01); *H04W 80/04* (2013.01)

(58) Field of Classification Search
CPC ..... H04L 1/20; H04L 25/0212; H04L 25/022; H04L 25/0222; H04L 25/03038; H04L 25/067; H04W 80/04; H04W 88/06
See application file for complete search history.

(56) References Cited

U.S. PATENT DOCUMENTS

| 8,254,911 B1 * | 8/2012 | Lee ............................... 455/425 |
| 2003/0012308 A1 * | 1/2003 | Sampath et al. .............. 375/340 |
| 2008/0075182 A1 | 3/2008 | Hsieh et al. |

(Continued)

FOREIGN PATENT DOCUMENTS

| EP | 2 479 946 A1 | 7/2012 |
| EP | 2 515 570 A1 | 10/2012 |

(Continued)

OTHER PUBLICATIONS

Edfors, Ove, et al. "OFDM channel estimation by singular value decomposition." Communications, IEEE Transactions on 46.7 (1998): 931-939.

(Continued)

*Primary Examiner* — Leon-Viet Nguyen
(74) *Attorney, Agent, or Firm* — NSIP Law

(57) ABSTRACT

An apparatus and a method are provided including a parameter estimator, a controller, an initial channel estimator, and a channel estimator. The parameter estimator configured to estimate parameters related to a channel. The controller configured to select one of channel environments based on the parameters, and generate a control signal corresponding to the selected channel environment. The initial channel estimator configured to estimate an initial channel based on the control signal. The channel estimator configured to estimate a channel of remaining resource blocks, excluding resource blocks corresponding to a pilot signal, from among resource blocks, based on the initial channel and the control signal.

21 Claims, 6 Drawing Sheets

(51) Int. Cl.
*H04L 25/06* (2006.01)
*H04W 80/04* (2009.01)

(56) References Cited

U.S. PATENT DOCUMENTS

| | | | |
|---|---|---|---|
| 2008/0080630 A1 | 4/2008 | Sung | |
| 2009/0180558 A1 | 7/2009 | Ma et al. | |
| 2010/0054322 A1* | 3/2010 | Hui et al. | 375/232 |
| 2013/0215826 A1* | 8/2013 | Kalyani et al. | 370/328 |
| 2014/0050111 A1* | 2/2014 | Nagata et al. | 370/252 |

FOREIGN PATENT DOCUMENTS

| | | |
|---|---|---|
| KR | 10-2005-0119592 A | 12/2005 |
| KR | 10-2006-0011758 A | 2/2006 |
| KR | 10-2007-0075939 A | 7/2007 |
| KR | 10-2007-0110616 A | 11/2007 |
| KR | 10-2011-0000668 A | 1/2011 |
| KR | 10-2012-0008834 A | 2/2012 |
| KR | 10-2012-0020225 A | 3/2012 |

OTHER PUBLICATIONS

Foroughi, Farzad, et al.. "Channel estimation for a mobile terminal in a multi-standard environment (LTE and DVB-H)." *Signal Processing and Communications Systems, 2009. ICSPCS 2009. 3rd International Conference on.* IEEE, 2009.

Takahashi, Daisuke et al. "High-performance radix-2, 3 and 5 parallel 1-D complex FFT algorithms for distributed-memory parallel computers." *The Journal of Supercomputing* 15.2 (2000): 207-228.

Abari, Farzad Foroughi, et al. "Low complexity channel estimation for LTE in fast fading environments for implementation on Multi-Standard platforms." Vehicular Technology Conference Fall (VTC 2010-Fall), 2010 IEEE 72nd. IEEE, 2010.

* cited by examiner

APPARATUS AND METHOD FOR ADAPTIVELY ESTIMATING CHANNEL IN ORTHOGONAL FREQUENCY DIVISION MULTIPLEXING (OFDM) SYSTEM

CROSS-REFERENCE TO RELATED APPLICATION(S)

This application claims the benefit under 35 U.S.C. §119 (a) of Korean Patent Application No. 10-2013-0025419, filed on Mar. 11, 2013, in the Korean Intellectual Property Office, the entire disclosure of which is incorporated herein by reference for all purposes.

BACKGROUND

1. Field

The following description relates to estimating a channel in an orthogonal frequency division multiplexing (OFDM) system, and more particularly, to an apparatus and method to control a channel estimation algorithm adaptively based on a channel environment.

2. Description of Related Art

An orthogonal frequency division multiplexing (OFMD) system is based on wireless transmission technology adopted in various fields, for example, 3rd Generation Partnership Project long-term evolution (3GPP LTE), wireless fidelity (WiFi) based on the Institute of Electrical and Electronics Engineers (IEEE) 802.11n/ac, a next broadcasting system, for example, Digital Video Broadcasting-Terrestrial/Satellite (DVB-T/S), and other similar fields. In addition, the OFMD system is considered as a promising transmission technology for a next generation communication system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus, including a parameter estimator configured to estimate parameters related to a channel; a controller configured to select one of channel environments based on the parameters, and generate a control signal corresponding to the selected channel environment; an initial channel estimator configured to estimate an initial channel based on the control signal; and a channel estimator configured to estimate a channel of remaining resource blocks, excluding resource blocks corresponding to a pilot signal, from among resource blocks, based on the initial channel and the control signal.

The initial channel may include a channel of the resource blocks corresponding to the pilot signal.

The channel estimator may include a first time estimator configured to estimate a channel in a time domain, based on the initial channel and the control signal; a noise remover configured to remove noise from an output of the first time estimator; a frequency estimator configured to estimate a channel in a frequency domain, based on an output from the noise remover and the control signal; and a second time estimator configured to estimate a channel in the time domain, based on an output from the frequency estimator and the control signal.

The noise remover may include an inverse discrete Fourier transform (DFT) unit configured to convert a domain of channel vectors in the output of the first time estimator into a time domain; a noise removal operation performer configured to remove noise from the domain-converted channel vectors; and a DFT unit configured to convert a domain of the noise-removed channel vectors into a frequency domain.

The parameter estimator may include a noise estimator configured to estimate noise of the channel; a delay estimator configured to estimate a delay spread of the channel; and a Doppler estimator configured to estimate a Doppler spread of the channel.

In response to the noise of the channel estimated being greater than a reference threshold, the controller may generate a control signal to direct the initial channel estimator to use a complex algorithm as an initial channel estimation algorithm.

The complex algorithm may include a minimum mean square error (MMSE) channel estimation technique.

The controller may select one of a full-minimum mean square error (MMSE) technique, a robust-MMSE technique, and a modified robust-MMSE technique depending on a current channel state, and generates the control signal based on the selected technique, and may control the frequency estimator using the generated control signal.

The control signal may include an indicator, of an initial channel estimation algorithm, to be used by the initial channel estimator.

The control signal may include information related to resource blocks for which the channel is estimated at the first time estimator; an indicator of a channel estimation algorithm to be used at the first time estimator; an indicator of a channel estimation algorithm to be used at the frequency estimator; and an indicator of a channel estimation algorithm to be used at the second time estimator.

The control signal may include an indicator of a fast Fourier transform (FFT) algorithm to be used at the inverse DFT unit; an indicator of a DFT-based channel estimation algorithm to be used at the noise removal operation performer; and an indicator of an FFT algorithm to be used at the DFT unit.

The initial channel estimation algorithm may include at least one of a least-square (LS) channel estimation technique, and a minimum mean square error (MMSE) channel estimation technique.

Each of the channel estimation algorithm to be used at the first time estimator and the channel estimation algorithm to be used at the second time estimator may include at least one of an iterative estimation technique, a recursive estimation technique, a linear interpolation technique, and a polynomial interpolation technique.

The channel estimation algorithm to be used at the frequency estimator may include at least one of a full-minimum mean square error (MMSE) technique, a robust-MMSE technique, and a modified robust-MMSE technique.

The FFT algorithm to be used at the inverse DFT unit and the FFT algorithm to be used at the DFT unit may include at least one of a technique to process a channel vector of a length corresponding to exponential values of "2", and a technique to process a channel vector of various lengths, aside from the exponential values of "2".

In accordance with another illustrative configuration, there is provided a method, including estimating parameters related to a channel; selecting one of channel environments, based on the parameters; generating a control signal corresponding to the selected channel environment; estimating an initial channel based on the control signal; and estimating a channel of remaining resource blocks, excluding resource blocks corresponding to a pilot signal from among resource blocks, based on the initial channel and the control signal.

The method may also include configuring the initial channel to comprise a channel of the resource blocks corresponding to the pilot signal.

The estimating of the channel may include estimating a channel in a time domain, based on the initial channel and the control signal; converting a domain of channel vectors obtained from the estimating into a time domain; removing noise in the domain-converted channel vectors; converting a domain of the noise-removed channel vectors into a frequency domain; estimating a channel in a frequency domain, based on the domain-converted channel vectors and the control signal; and estimating a channel in the time domain, based on the channel-estimated channel vectors and the control signal.

The estimating of the parameters may include estimating noise of the channel; estimating a delay spread of the channel; and estimating a Doppler spread of the channel.

In accordance with a further illustrative configuration, there is provided a non-transitory computer-readable medium including a program for instructing a computer to perform the method as described above.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
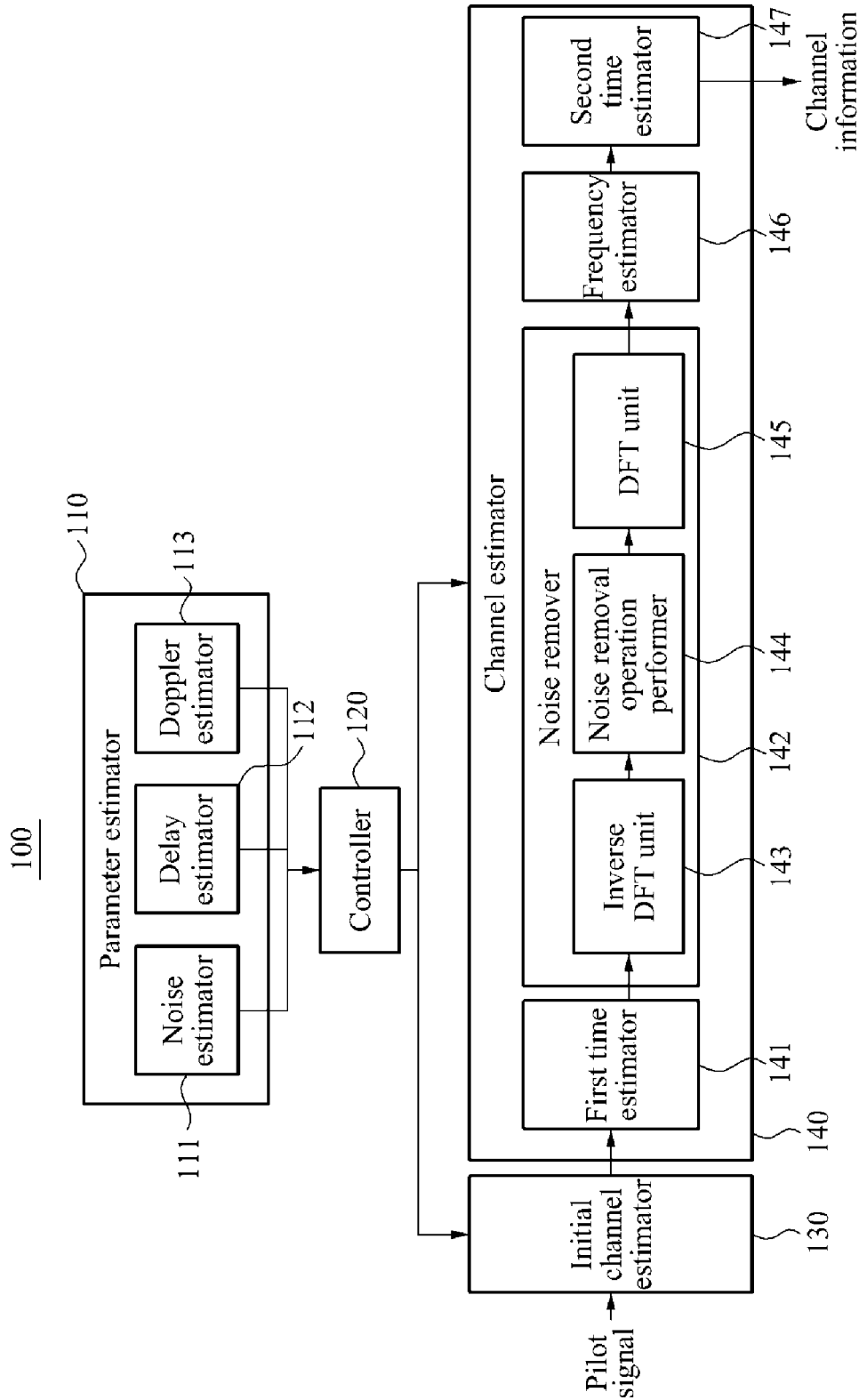
FIG. 1 is a diagram illustrating an example of an apparatus to adaptively estimate a channel in an orthogonal frequency division multiplexing (OFDM) system, in accordance with an illustrative configuration.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

In accordance with the following description, an apparatus to adaptively estimate a channel in an orthogonal frequency division multiplexing (OFDM) system will be described with reference to FIG. 1. Also, a delay spread of a channel and a Doppler spread of a channel in the OFDM system will be described. In one example, channel estimation is a function to decode a received signal in a synchronous wireless communication system.

In general, in a wireless communication system, a channel may have various characteristics based on a velocity of a moving terminal, an environment surrounding the terminal, a number of other adjacent users, a distance from a base station, and other similar characteristics. In one example, the environment may include adjacent buildings and topography.

For example, in an urban environment with high-rise buildings, signals transmitted from a transmitter may be reflected a number of times before the signals are received at a receiver. Accordingly, the receiver receives the signals through various paths and, as a result, the receiver may receive the signals transmitted along different paths with different degrees of delay.

Accordingly, in such an urban environment, a delay spread may increase, which indicates degrees of delay of the signals transmitted through a plurality of paths.

In contrast, in a rural environment, which normally encompasses less structural obstructions, a fewer number of signals may be reflected. In this instance, degrees of delay may decrease with respect to signals transmitted through a plurality of paths. Accordingly, the delay spread in the rural environment may be less than the delay spread in the urban environment.

Referring to Equation 1, generally, a delay spread may affect a frequency selectivity of a channel.

$$T_d \propto 1/B_c \quad \text{[Equation 1]}$$

In Equation 1, $T_d$ denotes a delay spread, and $B_c$ denotes a channel coherent bandwidth. The channel coherent bandwidth may refer to a frequency section in which a channel is unchanged, on average, in a frequency response of the channel. For example, a channel at two frequencies, within the channel coherent bandwidth, is almost unchanged or has a relatively high correlation.

In accordance with an illustrative example, when a bandwidth of a signal is greater than the channel coherent bandwidth, the channel is referred to as a frequency selective channel. When the bandwidth of the signal is less than the channel coherent bandwidth, the channel is referred to as a frequency nonselective channel, or a flat fading channel.

In addition, the channel may be affected by a velocity of a terminal. In general, as a velocity of a terminal increases, a Doppler frequency may increase and, as a result, a Doppler delay may increase.

Referring to Equation 2, the Doppler delay may affect a time selectivity of the channel.

$$D_s \propto 1/T_c \quad \text{[Equation 2]}$$

In Equation 2, $D_s$ denotes a Doppler delay, and $T_c$ denotes a channel coherent time. The channel coherent time may refer to a time section in which a channel is unchanged on average in a time response of the channel. For example, within the channel coherent time two instances is almost unchanged or has a relatively high correlation.

For reference, when a symbol time or a pulse time of a signal is less than the channel coherent time, the channel may be almost unchanged in a symbol section of the signal and, as a result, the channel may be referred to as a slow fading channel. Conversely, when the symbol time of the signal is greater than the channel coherent time, the channel may be changed in the symbol section and, as a result, the channel may be referred to as a fast fading channel.

As described above, a channel may be changed along a frequency axis and a time axis based on a surrounding environment, and a change in the channel may be greatly affected by the surrounding environment.

The channel estimation apparatus may provide technology for adaptively estimating a channel through various channel environments. Hereinafter, a configuration of the channel estimation apparatus will be described in detail with reference to FIG. 1.

FIG. 1 illustrates an example of an apparatus 100 to adaptively estimate a channel in an OFDM system, in accordance with an illustrative configuration.

Referring to FIG. 1, the apparatus 100 includes a parameter estimator 110, a controller 120, an initial channel estimator 130, and a channel estimator 140.

The parameter estimator 110 estimates parameters related to a channel. In particular, the parameter estimator 110 includes a noise estimator 111 configured to estimate noise of a channel, a delay estimator 112 configured to estimate a delay spread of the channel, and a Doppler estimator 113 configured to estimate a Doppler spread of the channel.

The controller 120 may adaptively select one of predetermined channel environments, based on the parameters, which include, at least, the noise, the spread, and the Doppler spread of the channel, the parameter estimator 110 estimated.

In one illustrative example, the channel environments may be predetermined or defined based on various variables. For example, the predetermined channel environments may include a channel environment of an urban region in which signals may be reflected through various paths due to a high density of buildings, a channel environment of a rural region having a relatively fewer number of paths through which signals may be reflected, when compared to the urban region, or other regions.

In addition, the channel environments may be predetermined or defined based on a velocity of a moving object in the OFDM system. In this instance, the predetermined channel environments may include a channel environment intended for a user moving on foot, a channel environment intended for a user moving in a vehicle, or other similar circumstances surrounding the user.

Furthermore, the channel environments may be predetermined or defined by combining the aforementioned variables. For example, the channel environments may include a channel environment intended for a user moving on foot in an urban region, a channel environment intended for a user moving using a vehicle in an urban region, a channel environment intended for a user moving on foot in a rural region, or a channel environment intended for a user moving using a vehicle in a rural region.

The controller 120 selects a single channel environment that is most associated with the parameters estimated at the parameter estimator 110, from among the predetermined channel environments. As another example, the controller 120 selects a channel environment additionally based on a required complexity, for example, a quality of service (QoS), latency, and other similar additional parameters. In this instance, the controller 120 generates a control signal corresponding to the selected channel environment.

The initial channel estimator 130 obtains a pilot signal to estimate an initial channel. The initial channel estimator 130 also estimates the initial channel based on the control signal generated at the controller 120. In this instance, the control signal generated at the controller 120 may include an indicator of an initial channel estimation algorithm to be used by the initial channel estimator 130.

Figure 2:
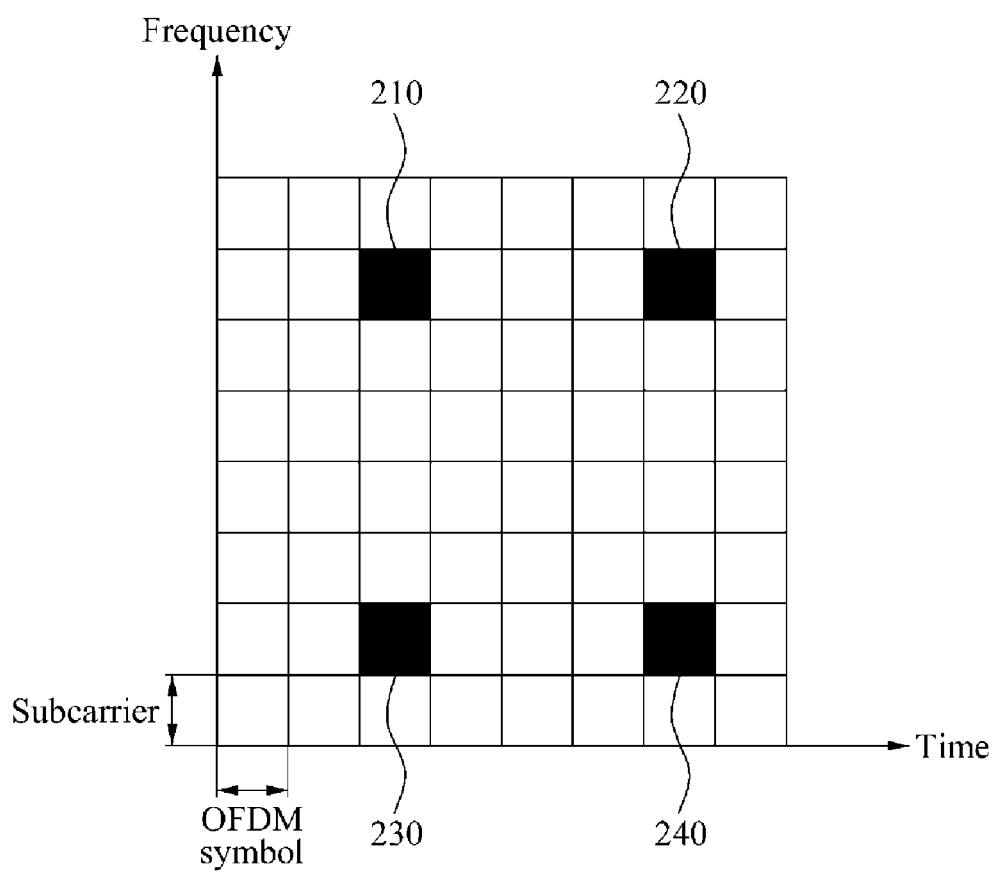
FIG. 2 is a graph illustrating an example of resource blocks of which a channel is estimated by an initial channel estimator, in accordance with an illustrative configuration.

In one illustrative example, the initial channel includes a channel of resource blocks corresponding to the pilot signal, among resource blocks included in an OFDM resource grid. Referring to FIG. 2, an OFDM resource grid 200 illustrates modulated symbols indicated on a time axis and a frequency axis, and includes the resource blocks. In this instance, a resource block may correspond to a single OFDM modulated symbol. In the OFDM resource grid 200, a horizontal axis denotes a time axis of OFDM symbol units, and a vertical axis denotes a frequency axis of subcarrier units.

The channel estimator 140 estimates a channel based on the control signal generated at the controller 120 and the initial channel estimated at the initial channel estimator 130. For example, the channel estimator 140 estimates a channel of remaining resource blocks, excluding the resource blocks corresponding to the pilot signal from the resource blocks included in the OFDM resource grid, based on the initial channel and the control signal.

To estimate the channel of remaining resource blocks, the channel estimator 140 includes a first time estimator 141, a noise remover 142, a frequency estimator 146, and a second time estimator 147.

The first time estimator 141 estimates a channel in a time domain, based on the initial channel and the control signal. For example, the first time estimator 141 estimates a channel of resource blocks positioned in a frequency band identical to a frequency band of the resource blocks corresponding to the pilot signal within the OFDM resource grid.

In this instance, the first time estimator 141 combines the channel of the resource blocks estimated at the initial channel estimator 130 and the channel of the resource blocks estimated at the first time estimator 141 and outputs a result indicative of the combination.

In this instance, the control signal generated at the controller 120 may include information related to the resource blocks for which the channel is estimated at the first time estimator 141, and an indicator of the channel estimation algorithm to be used by the first time estimator 141. In this instance, the information may include, for example, a number of corresponding resource blocks, and positions of the corresponding resource blocks.

The noise remover 142 removes noise from an output of the first time estimator 141 using a discrete Fourier transform (DFT) technique. In one example, the noise remover 142 includes an inverse DFT unit 143, a noise removal operation performer 144, and a DFT unit 145.

The inverse DFT unit 143 converts a domain of channel vectors in the output of the first time estimator 141 into a time domain. The noise removal operation performer 144 removes noise in the domain-converted channel vectors. The DFT unit 145 converts a domain of the noise-removed channel vectors into a frequency domain.

In one example, the control signal generated at the controller 120 includes an indicator of a fast Fourier transform (FFT) algorithm to be used at the inverse DFT unit 143, an indicator of a DFT-based channel estimation algorithm to be used at the noise removal operation performer 144, and an indicator of an FFT algorithm to be used at the DFT unit 145.

The frequency estimator 146 estimates a channel in a frequency domain based on the control signal generated at the controller 120 and an output of the noise remover 142. For example, the frequency estimator 146 estimates a channel of resource blocks positioned on the same time axis as the resource blocks of which the channel is estimated by the first time estimator 141 and the resource blocks corresponding to the pilot signal within the OFDM resource grid. In this example, the control signal generated at the controller 120 includes an indicator of a channel estimation algorithm to be used by the frequency estimator 146.

The second time estimator 147 estimates a channel in a time domain, based on the control signal generated at the controller 120 and an output of the frequency estimator 146. For example, the second time estimator 147 estimates a channel of remaining resource blocks of which a channel is yet to be estimated at the initial channel estimator 130, the first time estimator 141, and the frequency estimator 146, among the resource blocks included in the OFDM resource grid. In this example, the control signal generated at the controller 120 includes an indicator of a channel estimation algorithm to be used at the second time estimator 147.

As described above, when the OFDM resource grid 200 is provided as shown in FIG. 2, the apparatus 100 estimates channels for all of the resource blocks included in the OFDM resource grid 200.

In this instance, the controller 120 generates a control signal based on various variables affecting channels, for example, a user surrounding environment, whether or not the user moves, a velocity of the user moving, to apply an adaptive channel estimation algorithm to the initial channel estimator 130 and the channel estimator 140.

Adaptive channel estimation algorithms to be applied to the initial channel estimator 130 and the channel estimator 140 will be described in detail with reference to FIGS. 2 through 5.

Although FIG. 1 illustrates the parameter estimator 110, the channel estimator 140, and the noise remover 142 are illustrated to include certain structural elements, it is to be appreciated that additional elements may be included or fewer structural elements may be included to achieve the same result. For instance, the parameter estimator 110 may include a processor or controller configured to perform the functionalities of the noise estimator 111, the delay estimator 112, and the Doppler estimator 113. In the alternative, the noise estimator 111 may be provided external to the parameter estimator 110. Similar alternative configurations may be achieved with respect to the channel estimator 140 and the noise remover 142. Furthermore, in one configuration, the initial channel estimator 130 may be configured to be either part of the controller 120 or the channel estimator 140.

FIG. 2 illustrates an example of resource blocks of which a channel is estimated by an initial channel estimator, in accord with an illustrative configuration.

Referring to FIG. 2, the OFDM resource grid 200 includes resource blocks.

In this example, resource blocks 210, 220, 230, and 240 are symbols corresponding to a pilot signal. In an OFDM system, a transmitter may transmit a pilot signal to positions of the resource blocks 210, 220, 230, and 240. In this instance, the pilot signal corresponds to a symbol predetermined between the transmitter and a receiver, for example, a symbol "0".

A symbol included in a received symbol stream is expressed by Equation 3.

$$y = hx + n \quad \text{[Equation 3]}$$

In Equation 3, y denotes a received symbol, h denotes a fading factor multiplied in a channel, x denotes a transmission symbol modulated at a transmission end, and n denotes noise added in a channel.

In one configuration, an initial channel estimator is aware of a predetermined symbol x and, thus, removes a term x from the received signal y. Accordingly, the initial channel estimator estimates a channel h of each of the resource blocks 210, 220, 230, and 240.

In this instance, the initial channel estimator may use various initial channel estimation algorithms. For example, the initial channel estimator estimates an initial channel using a least-square (LS) estimation technique. The LS estimation technique estimates an initial channel rapidly due to its low complexity, and may not require additional statistics information required for a relatively complex initial channel estimation algorithm. In one example, the statistics information includes correlation information or covariance information.

The LS estimation technique may be expressed by Equation 4.

$$\hat{h} = yx^{-1} = h + nx^{-1} \quad \text{[Equation 4]}$$

In Equation 4, denotes a form in which transformed noise $nx^{-1}$ is added to an actual channel h. Accordingly, in a case of terrible noise, an initially estimated channel $\hat{h}$ may become inaccurate due to the transformed noise $nx^{-1}$. Because an error occurring in the initial channel estimator may be propagated to a channel estimator, a role of the initial channel estimator may be highly important. Accordingly, a controller may predict a channel state based on parameters estimated at a parameter estimator to control an operation of the initial channel estimator.

For example, when it is determined that noise of a channel estimated at a noise estimator of a parameter estimator is greater than a predetermined reference threshold, the controller generates a control signal to direct the initial channel estimator to use an initial channel estimation algorithm, for example, a minimum mean square error (MMSE) channel estimation technique, which is more complex than the LS estimation technique.

Accordingly, an apparatus to estimate a channel selects an initial channel estimation algorithm with a different complexity, depending on a channel state to increase increasing initial channel estimation performance.

Figure 3:
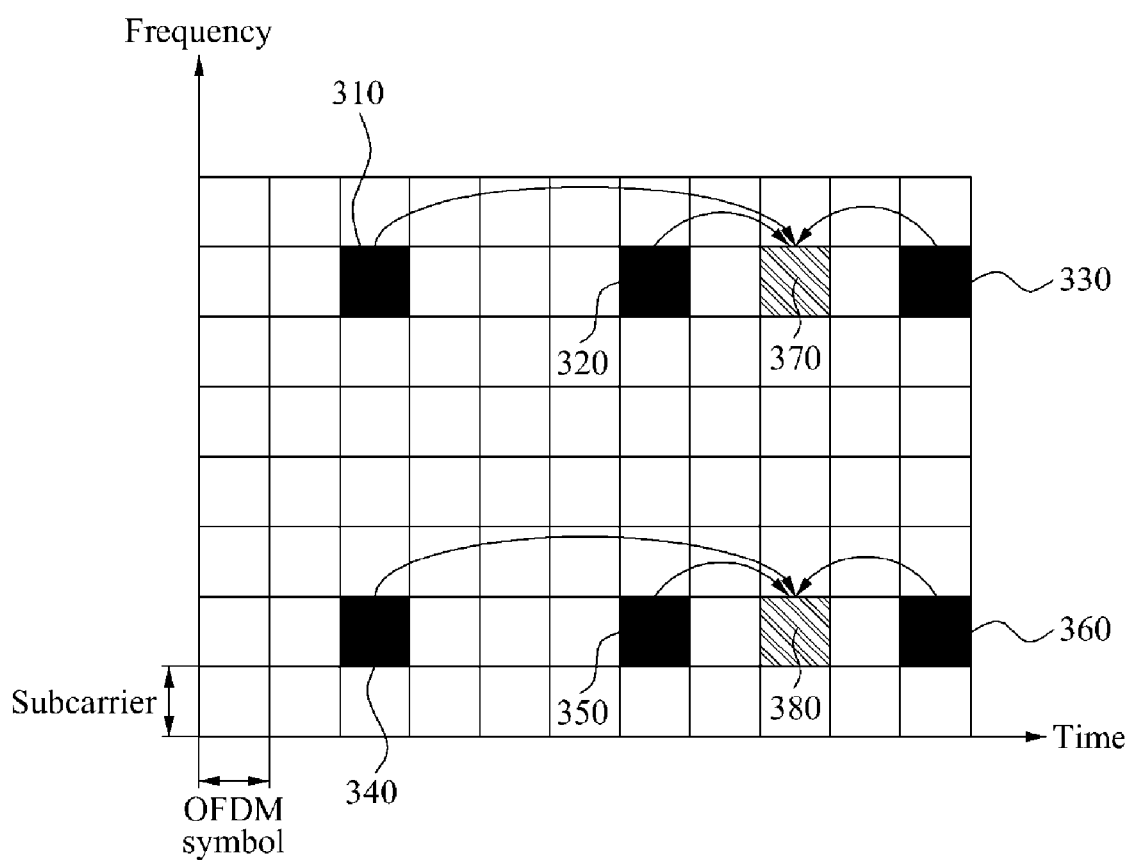
FIG. 3 is a graph illustrating an example of resource blocks of which a channel is estimated by a first time estimator, in accordance with an illustrative configuration.

FIG. 3 illustrates an example of resource blocks of which a channel is estimated by a first time estimator, in accordance with an illustrative example.

Referring to FIG. 3, the first time estimator estimates a channel of neighboring resource blocks corresponding to an identical subcarrier, from an initial channel estimated by an initial channel estimator.

For example, the first time estimator estimates a channel of a resource block 370 using a channel of at least one resource block, for example, resource blocks 310, 320, and 330, corresponding to an identical subcarrier. Similarly, the first time estimator estimates a channel of a resource block 380 using a channel of resource blocks 340, 350, and 360.

In this instance, the first time estimator uses various channel estimation algorithms.

For example, the first time estimator uses a recursive estimation technique that copies a channel of one of adjacent resource blocks, for example, the resource blocks 320, 330, and the like, corresponding to a subcarrier identical to a subcarrier of the resource block 370.

As another example, the first time estimator uses a linear interpolation technique based on a channel of two adjacent resource blocks, for example, the resource blocks 320 and 330, corresponding to a subcarrier identical to the subcarrier of the resource block 370. As still another example, the first time estimator uses a polynomial interpolation technique based on a channel of at least three resource blocks, for example, the resource blocks 310, 320, and 330, corresponding to a subcarrier identical to the subcarrier of the resource block 370.

A controller determines a channel estimation algorithm to be used at the first time estimator. In addition, the controller determines a number of resource blocks of which a channel is to be estimated by the first time estimator, and positions of the resource blocks.

For example, three resource blocks, of which a channel is to be estimated, are present between the resource block 320 and the resource block 330 corresponding to a pilot signal. In this instance, the controller generates a control signal to indicate a resource block of which a channel is to be estimated, among the three resource blocks.

In a particularly good channel environment, in order to reduce a complexity of channel estimation, the controller may determine not to estimate at the first time estimator a channel of one of the resource blocks. In this instance, an output of the initial channel estimator is bypassed as an output of the first time estimator.

As a number of resource blocks of which a channel is estimated by the first time estimator increases, a complexity of the overall channel estimation operation may increase because an inverse DFT unit, a noise removal operation performer, a DFT unit, and a frequency estimator may be operated based on the output of the first time estimator.

Accordingly, the controller may determine, based on a channel state, resource blocks of which a channel is to be estimated at the first time estimator, and a channel estimation algorithm to be used at the first time estimator to perform adaptive channel estimation.

The inverse DFT unit may apply an inverse DFT technique to channel vectors obtained as a result of estimating a channel by the first time estimator to convert a domain of the corresponding channel vectors into a time domain.

In this instance, various changes may be made to a length of a channel vector based on standards, for example, long-term evolution (LTE), Digital Video Broadcasting-Handheld (DVB-H), a scale of FFT to be used for OFDM modulation, or a bandwidth.

The controller generates, based on the length of the channel vector, a control signal to direct processing channel vectors with lengths corresponding to exponential values of "2", or processing channel vectors with various lengths, aside from the exponential values of "2" be used.

For example, when the length of the channel vector is substantially close to an exponential value of "2", the controller selects a typical type of FFT technique. Otherwise, the controller selects an FFT technique supporting various lengths corresponding to, for example, exponential values of "3" or exponential value of "5".

According to a characteristic of a communication channel, energy may be concentrated on front samples of a channel vector output by the inverse DFT unit. According to a characteristic of the inverse DFT technique, rear samples of the corresponding channel vector may have values other than "0". However, an actual channel vector may include noise and, as a result, intermediate samples of the corresponding channel vector are forced to have a value of "0".

In one illustrative configuration, the noise removal operation performer performs the operation described above. In addition, the noise removal operation performer may perform an operation of increasing the values of the rear samples and the front samples on which the energy is concentrated.

For example, the noise removal operation performer multiplies a channel vector output from the inverse DFT unit by a coefficient expressed by Equation 5.

$$(c_1, c_2, \ldots, c_L, 0, \ldots, 0, c_{N-K}, \ldots, c_N) \quad \text{[Equation 5]}$$

The DFT unit converts a domain of the channel vector processed by the noise removal operation performer into a frequency domain. Similarly, the controller generates, based on the length of the channel vector, a control signal to instruct processing of channel vectors of lengths that corresponds to exponential values of "2", or processing of channel vectors with various lengths, aside from the exponential values of "2" be used. Accordingly, the DFT unit uses an FFT technique corresponding to a DFT length.

Figure 4:
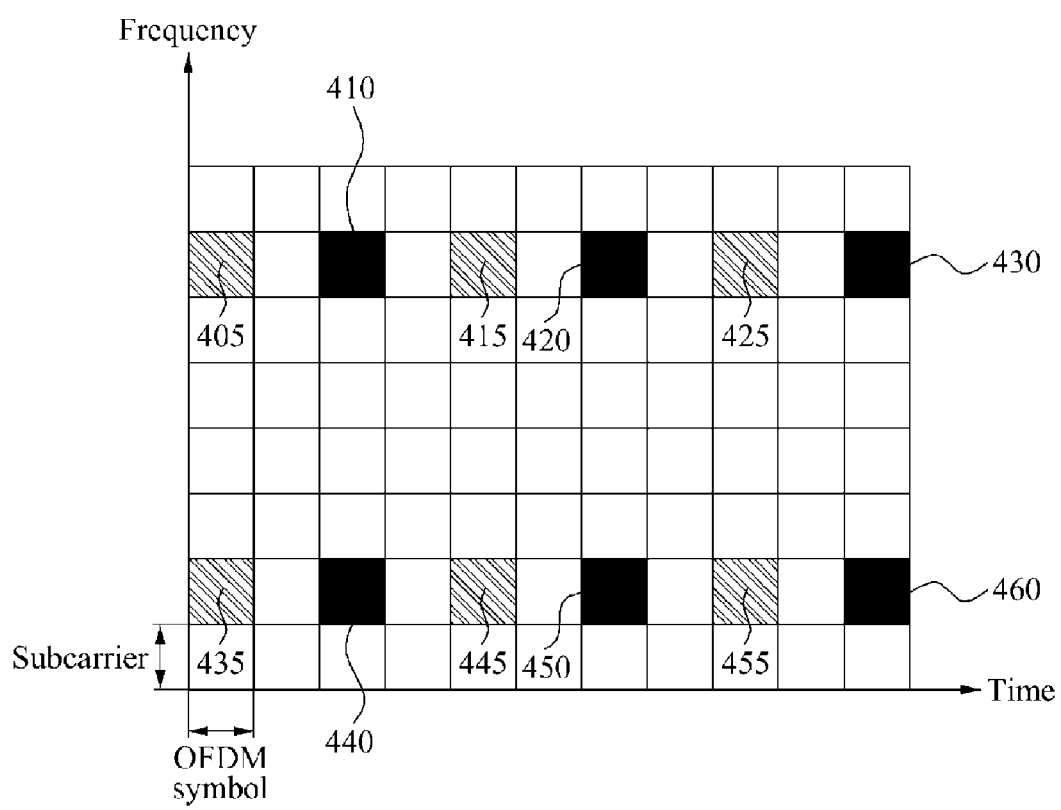
FIGS. 4 and 5 are graphs illustrating examples of resource blocks of which a channel is estimated by a frequency estimator, in accordance with an illustrative configuration.
Figure 5:
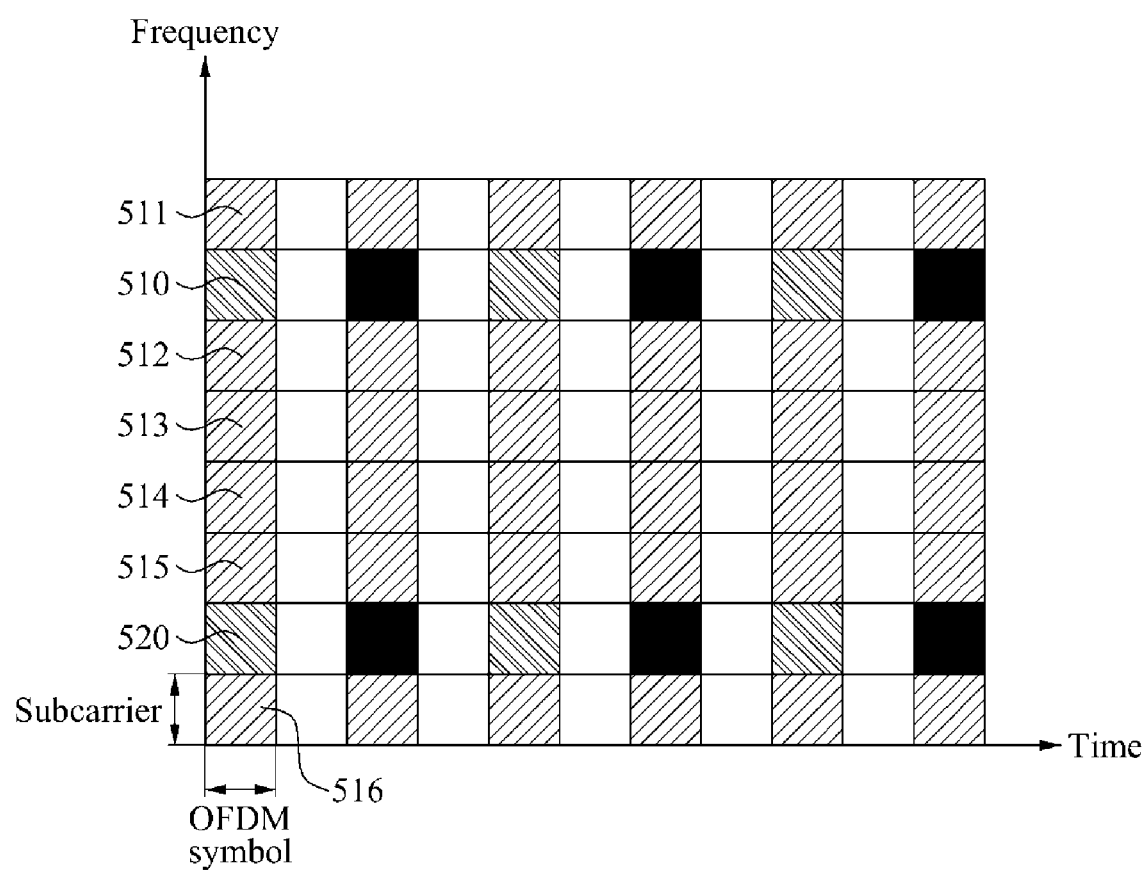

FIGS. 4 and 5 illustrate examples of resource blocks of which a channel is estimated by a frequency estimator, in accord with an illustrative example.

Referring to FIG. 4, a first time estimator estimates a channel of six resource blocks 405, 415, 425, 435, 445, and 455. In this instance, a magnitude of a channel vector output from a DFT unit is identical to a magnitude of a channel vector input into an inverse DFT unit.

In this example, a frequency estimator applies a channel estimation algorithm, in a direction of a frequency axis, to resource blocks 410, 420, 430, 440, 450, and 460 corresponding to a pilot signal, and the resource blocks 405, 415, 425, 435, 445, and 455 of which the channel is estimated at the first time estimator. Accordingly, referring to FIG. 5, the frequency estimator estimates a channel of resource blocks 511, 512, 513, 514, 515, and 516.

For example, the frequency estimator estimates the channel of the six resource blocks 511, 512, 513, 514, 515, and 516 from the previously estimated channel of the two resource blocks 510 and 520.

A controller determines a channel estimation algorithm to be used at the frequency estimator based on at least one of a channel environment and a required complexity.

For example, when a statistic characteristic, for example, correlation information or covariance information of a channel in a frequency domain is known, the controller applies a full-MMSE technique. The full-MMSE technique may be expressed by Equation 6.

$$\hat{h} = R_{hh}\left(R_{hh} + \frac{\beta}{SNR}I\right)^{-1}\hat{h}_p \quad \text{[Equation 6]}$$

In Equation 6, denotes a correlation matrix of a channel, SNR denotes a signal to noise ratio, and nP denotes a channel vector per OFDM symbol being input into the frequency estimator. Referring to FIG. 5, $\hat{h}_p$ with respect to a first OFDM symbol corresponds to a channel vector with respect to the two resource blocks 510 and 520, and the channel vector has a length of "2". A final resulting vector $\hat{h}$ corresponds to a vector having a length of "8".

However, the full-MMSE technique may be applied only when $R_{hh}$ corresponding to a channel characteristic is known. Because it is difficult to identify all characteristics of channels which vary in a real environment, the controller may select a robust-MMSE technique having a relatively low complexity, depending on a case.

The robust-MMSE technique refers to a technique of obtaining a correlation matrix of a channel on an assumption that a delay profile of the channel is uniform. In one illustrative example, the correlation matrix of the channel obtained by the robust-MMSE technique is expressed by Equation 7.

$$R_{hh} = E\{hh^H\} = [r_{m,n}] \quad \text{[Equation 7]}$$

In Equation 7, an operator E{ } denotes an expectation function using an average value, and [$r_{m,n}$] denotes an element in an $m^{th}$ column and an $n^{th}$ row. Here, $r_{m,n}$ may be expressed by Equation 8.

$$r_{m,n} = \frac{1 - e^{-2\pi jL(m-n)/N}}{2\pi jL\frac{m-n}{N}} \quad \text{[Equation 8]}$$

In Equation 8, L denotes a delay spread, and N denotes a total number of channel samples. When a value of L of a channel is provided, the frequency estimator performs channel estimation using an MMSE technique, by obtaining $R_{hh}$ using Equation 8.

However, in the robust-MMSE technique, an inverse matrix of a (P×P) matrix is to be obtained. In one example, P denotes a length of a channel vector $\hat{h}_p$. Accordingly, as a scale of FFT increases and the length of the channel vector $\hat{h}_p$ increases, a complexity of the robust-MMSE technique may increase drastically. For example, the scale of the FFT in a 20 megahertz (MHz) LTE system may correspond to 2048, and a number of resource blocks may correspond to 100. In this instance, the length P may be increased to 200.

Accordingly, the controller selects a modified robust-MMSE technique of which a complexity is much lower, depending on a case. The modified robust-MMSE technique refers to a technique of dividing P into "a" number of segments, and iteratively performing, "a" number of times, an MMSE channel estimation technique corresponding to a length of P/a.

The controller selects one of the full-MMSE technique, the robust-MMSE technique, and the modified robust-MMSE technique, depending on a current channel state. The controller generates a control signal based on the selected technique, and controls the frequency estimator using the generated control signal.

In addition, when the robust-MMSE technique is selected, the controller adjusts a value of "a" to determine a complexity and performance of a channel estimation algorithm to be performed at the frequency estimator.

A second time estimator estimates a channel of resource blocks yet to be filled in FIG. 5. The description provided with respect to the first time estimator applies to the second time estimator and thus, a further detailed description will be omitted for conciseness.

Figure 6:
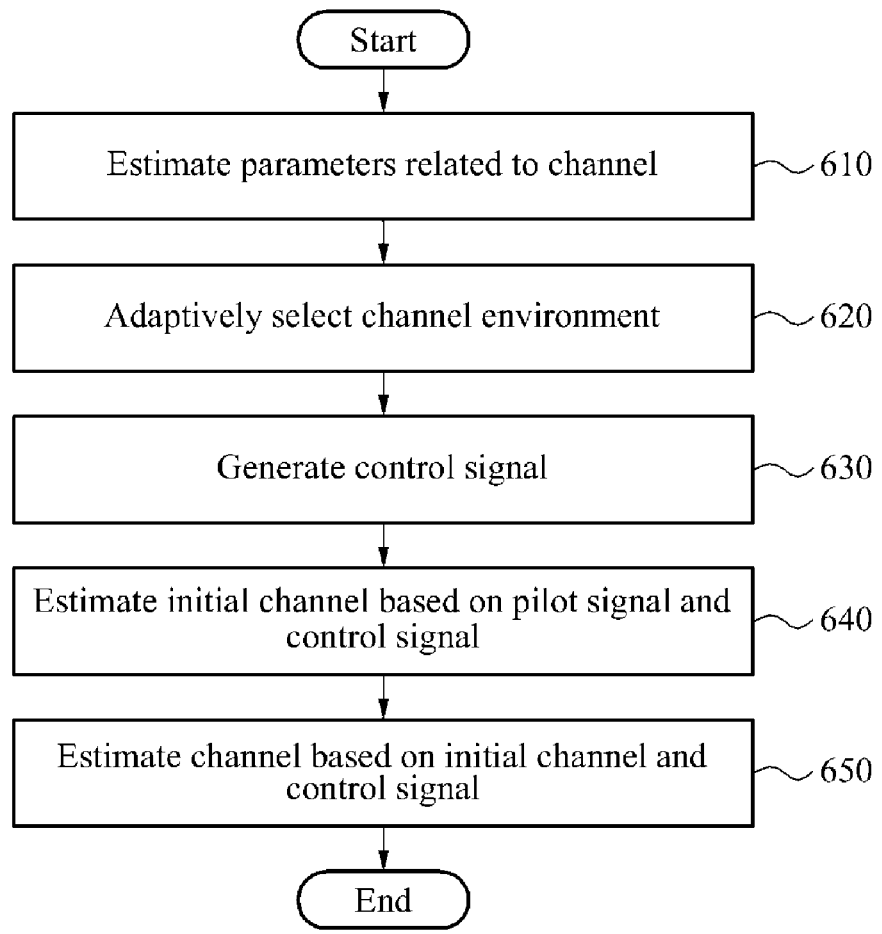
FIG. 6 is a flowchart illustrating an example of a method to adaptively estimate a channel in an OFDM system, in accordance with an illustrative configuration.

FIG. 6 illustrates an example of a method to adaptively estimate a channel in an OFDM system, in accordance with an illustrative example.

Referring to FIG. 6, at operation 610, the method estimates parameters related to a channel of the OFDM system. At operation 620, the method adaptively selects one of predetermined channel environments based on the estimated parameters.

At operation 630, the method generates a control signal corresponding to the selected channel environment. At operation 640, the method estimates an initial channel based on the generated control signal and a pilot signal. In one example, the initial channel may include a channel of resource blocks corresponding to the pilot signal, among resource blocks in an OFDM resource grid.

At operation 650, the method estimates a channel of remaining resource blocks, excluding the resource blocks corresponding to the pilot signal from among the resource blocks in the OFDM resource grid, based on the initial channel and the control signal.

The descriptions provided with reference to FIGS. 1 through 5 apply to the operations of FIG. 6 and thus, a further detailed description will be omitted for conciseness.

As described herein, the channel estimation apparatus and method may provide adaptable and flexible technology to be applied in various environments.

In addition, the channel estimation apparatus and method may be applied to a next generation software modem using a reconfigurable processor. The channel estimation apparatus and method may provide technology to support different communication standards in the next generation software modem.

Furthermore, the channel estimation apparatus and method may apply a channel estimation algorithm with a different complexity depending on a channel state to reduce an amount of time to execute operations and reduce power consumption. For example, when a good channel environment is provided, the channel estimation apparatus and method may apply a channel estimation algorithm with a relatively low complexity, thereby reducing an amount of time to execute operations and reducing power consumption.

The units described herein may be implemented using hardware components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

Software may be included in the processing device such as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus, comprising:
    a parameter estimator configured to estimate parameters related to a channel;
    a controller configured to select one of channel environments based on the parameters, and generate a control signal corresponding to the selected channel environment;
    an initial channel estimator configured to estimate an initial channel based on the control signal; and
    a channel estimator configured to estimate a channel of remaining resource blocks, excluding resource blocks corresponding to a pilot signal, from among resource blocks, based on the initial channel and the control signal,
    wherein the channel estimator is further configured to:
    estimate a first channel in a time domain based on the initial channel, estimate a second channel in a frequency domain based on the first channel, and estimate a third channel in the time domain based on the second channel.

2. The apparatus of claim 1, wherein the initial channel comprises a channel of the resource blocks corresponding to the pilot signal.

3. The apparatus of claim 1, wherein the channel estimator comprises:
    a first time estimator configured to estimate the first channel in the time domain, based on the initial channel and the control signal;
    a noise remover configured to remove noise from an output of the first time estimator;
    a frequency estimator configured to estimate the second channel in the frequency domain, based on an output from the noise remover and the control signal; and
    a second time estimator configured to estimate the third channel in the time domain, based on an output from the frequency estimator and the control signal.

4. The apparatus of claim 3, wherein the noise remover comprises:
    an inverse discrete Fourier transform (DFT) unit configured to convert a domain of channel vectors in the output of the first time estimator into a time domain;
    a noise removal operation performer configured to remove noise from the domain-converted channel vectors; and
    a DFT unit configured to convert a domain of the noise-removed channel vectors into a frequency domain.

5. The apparatus of claim 1, wherein the parameter estimator comprises:
    a noise estimator configured to estimate noise of the channel;
    a delay estimator configured to estimate a delay spread of the channel; and
    a Doppler estimator configured to estimate a Doppler spread of the channel.

6. The apparatus of claim 5, wherein, when the noise of the channel is estimated, in response to the noise of the channel estimated being greater than a reference threshold, the controller generates a control signal to direct the initial channel estimator to use a complex algorithm as an initial channel estimation algorithm.

7. The apparatus of claim 6, wherein the complex algorithm comprises a minimum mean square error (MMSE) channel estimation technique.

8. The apparatus of claim 3, wherein the controller selects one of a full-minimum mean square error (MMSE) technique, a robust-MMSE technique, and a modified robust-MMSE technique depending on a current channel state, and generates the control signal based on the selected technique, and controls the frequency estimator using the generated control signal.

9. The apparatus of claim 1, wherein the control signal comprises an indicator, of an initial channel estimation algorithm, to be used by the initial channel estimator.

10. The apparatus of claim 3, wherein the control signal comprises:
    information related to resource blocks for which the channel is estimated at the first time estimator;
    an indicator of a channel estimation algorithm to be used at the first time estimator;
    an indicator of a channel estimation algorithm to be used at the frequency estimator; and
    an indicator of a channel estimation algorithm to be used at the second time estimator.

11. The apparatus of claim 4, wherein the control signal comprises:
    an indicator of a fast Fourier transform (FFT) algorithm to be used at the inverse DFT unit;
    an indicator of a DFT-based channel estimation algorithm to be used at the noise removal operation performer; and
    an indicator of an FFT algorithm to be used at the DFT unit.

12. The apparatus of claim 9, wherein the initial channel estimation algorithm comprises at least one of a least-square (LS) channel estimation technique, and a minimum mean square error (MMSE) channel estimation technique.

13. The apparatus of claim 10, wherein each of the channel estimation algorithm to be used at the first time estimator and the channel estimation algorithm to be used at the second time estimator comprises at least one of an iterative estimation technique, a recursive estimation technique, a linear interpolation technique, and a polynomial interpolation technique.

14. The apparatus of claim 10, wherein the channel estimation algorithm to be used at the frequency estimator comprises at least one of a full-minimum mean square error (MMSE) technique, a robust-MMSE technique, and a modified robust-MMSE technique.

15. The apparatus of claim 11, wherein the FFT algorithm to be used at the inverse DFT unit and the FFT algorithm to be used at the DFT unit comprise at least one of a technique to process a channel vector of a length corresponding to exponential values of "2", and a technique to process a channel vector of various lengths, aside from the exponential values of "2".

16. A method, comprising:
    estimating parameters related to a channel;
    selecting one of channel environments, based on the parameters;
    generating a control signal corresponding to the selected channel environment;
    estimating an initial channel based on the control signal; and
    estimating a channel of remaining resource blocks, excluding resource blocks corresponding to a pilot signal from among resource blocks, based on the initial channel and the control signal, wherein the estimating of the channel comprises:
estimating a first channel in a time domain based on the initial channel, estimating a second channel in a frequency domain based on the first channel, and estimating a third channel in the time domain based on the second channel.

17. The method of claim 16, further comprising:
configuring the initial channel to comprise a channel of the resource blocks corresponding to the pilot signal.

18. The method of claim 16, wherein the estimating of the channel comprises:
estimating a channel in a time domain, based on the initial channel and the control signal;
converting a domain of channel vectors obtained from the estimating into a time domain;
removing noise in the domain-converted channel vectors;
converting a domain of the noise-removed channel vectors into a frequency domain;
estimating a channel in a frequency domain, based on the domain-converted channel vectors and the control signal; and
estimating a channel in the time domain, based on the channel-estimated channel vectors and the control signal.

19. The method of claim 16, wherein the estimating of the parameters comprises:
estimating noise of the channel;
estimating a delay spread of the channel; and
estimating a Doppler spread of the channel.

20. A non-transitory computer-readable medium comprising a program for instructing a computer to perform the method of claim 16.

21. An apparatus, comprising:
a parameter estimator configured to estimate parameters related to a channel;
a controller configured to select one of channel environments based on the parameters, and generate a control signal corresponding to the selected channel environment;
an initial channel estimator configured to estimate an initial channel based on the control signal; and
a channel estimator configured to estimate a channel of remaining resource blocks, excluding resource blocks corresponding to a pilot signal, from among resource blocks, based on the initial channel and the control signal,
wherein the parameter estimator comprises
a noise estimator configured to estimate noise of the channel, and
wherein, in response to the noise of the channel estimated being greater than a reference threshold, the controller generates a control signal to direct the initial channel estimator to use a complex algorithm as an initial channel estimation algorithm.

* * * * *